US008855146B2

(12) United States Patent
Takahashi et al.

(10) Patent No.: US 8,855,146 B2
(45) Date of Patent: Oct. 7, 2014

(54) SYNCHRONOUS DELIVERY METHOD

(75) Inventors: Yosuke Takahashi, Yokohama (JP);
Shiro Mazawa, Yokohama (JP);
Akihiko Yoshida, Yokohama (JP); Daigo Takayanagi, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 83 days.

(21) Appl. No.: 13/555,222

(22) Filed: Jul. 23, 2012

(65) Prior Publication Data
US 2012/0287841 A1 Nov. 15, 2012

Related U.S. Application Data

(63) Continuation of application No. 11/994,916, filed as application No. PCT/JP2005/023288 on Dec. 19, 2005, now Pat. No. 8,228,892.

(30) Foreign Application Priority Data

Jul. 8, 2005 (JP) .................................. 2005-200337

(51) Int. Cl.
*H04J 3/12* (2006.01)
*H04W 56/00* (2009.01)
*H04L 12/18* (2006.01)
*H04W 92/12* (2009.01)

(52) U.S. Cl.
CPC .......... *H04L 12/1881* (2013.01); *H04W 56/001* (2013.01); *H04L 12/189* (2013.01); *H04W 92/12* (2013.01)
USPC .......................................... 370/522; 370/312

(58) Field of Classification Search
CPC .......... H04L 5/0053; H04W 4/06; H04J 3/125
USPC .......... 370/236, 312, 522, 328; 455/405, 439, 455/433
See application file for complete search history.

(56) References Cited

U.S. PATENT DOCUMENTS 7,349,359 B2 * 3/2008 Chang et al. .................. 370/312
2005/0128996 A1 6/2005 Yoshida et al.

FOREIGN PATENT DOCUMENTS

JP 10-136424 5/1998

OTHER PUBLICATIONS

"Interoperability Specification (IOS) for cdma2000 Access Network Interface—Part 5 (A3 and A7 Interfaces", 3GPP2 standard C. S0054, Feb. 2005.
"CDMA2000 High Rate Broadcast-Multicast Packet Data Air Interface Specification", 3GPP2 standard A. S0015-C v1.0, Feb. 2004.

* cited by examiner

*Primary Examiner* — Chandrahas Patel
(74) *Attorney, Agent, or Firm* — Antonelli, Terry, Stout & Kraus, LLP.

(57) ABSTRACT

A method for, in a radio communication system having at least a content server, plurality of base stations, and plurality of radio terminals, enabling two or more base stations among the plurality of base stations to broadcast or multicast data delivered from the content server to the radio terminals, the method includes: providing a Broadcast Multicast Service (BCMCS) Serving Node between the content server and two or more base stations; the BCMCS Serving Node includes a period number and sequence number into data delivered from the content server and transmits data including the period number and sequence number to the two or more base stations; in case that a synchronization is deviated or data is lost during data delivery from the base stations to the radio terminals, the base stations perform re-synchronization on a basis of the period number and sequence number included in data received from the BCMCS Serving Node.

5 Claims, 12 Drawing Sheets

| # | PHYSICAL DATA RATE | USABLE SLOTS | BLOCK HEADER | TRANSMITTABLE DATA AMOUNT WITHIN 5.12 SECONDS |
|---|---|---|---|---|
| 1 | 38.4kbps | 16 / 1MAC PACKET (1000bit) | 3 BYTES | 4,497 BYTES |
| 2 | 76.8kbps | 8 / 1MAC PACKET (1000bit) | 6 BYTES | 8,994 BYTES |
| 3 | 153.6kbps | 4 / 1MAC PACKET (1000bit) | 12 BYTES | 17,988 BYTES |
| 4 | 204.8kbps | 3 / 1MAC PACKET (1000bit) | 16 BYTES | 23,984 BYTES |
| 5 | 307.2kbps | 2 / 1MAC PACKET (1000bit) | 24 BYTES | 35,976 BYTES |
| 6 | 409.6kbps | 3 / 2MAC PACKET (2000bit) | 32 BYTES | 47,968 BYTES |
| 7 | 614.4kbps | 1 / 1MAC PACKET (1000bit) | 48 BYTES | 71,952 BYTES |

SYNCHRONOUS DELIVERY METHOD

CROSS REFERENCE TO RELATED APPLICATION

This is a continuation of U.S. application Ser. No. 11/994,916, filed Jul. 1, 2009 now U.S. Pat. No. 8,228,892. This application relates to and claims priority from Japanese Patent Application No. 2005-200337, filed on Jul. 8, 2005. The entirety of the contents and subject matter of all of the above is incorporated herein by reference.

TECHNICAL FIELD

The present invention relates to a synchronous delivery method, and particularly to a synchronous delivery method of transmitting delivery data to radio-terminals via a plurality of base stations from an aggregation device in synchronization with identical time information, in a radio communication system including the plurality of base stations and the aggregation device for aggregating the plurality of base stations.

BACKGROUND ART

In 3GPP2 (3rd Generation Partnership Project 2) of the International Standards Organization, a standardization has been performed for a cdma2000 1x system of a mobile communication system feasible for a voice communication and data communication, and a cdma2000 1xEV-DO (1x Evolution—Data Only) system of a mobile radio communication system, the spectrum efficiency of which is improved by specialization exclusively used for the data communication. The cdma2000 1x and 1xEV-DO communication systems were used so that a unicast communication which communicates with the terminals by one-to-one manner is realized by a mobile network. However, a multicast communication has been studied to realize a communication by one-to-multitude manner. As factors of technique for realizing the multicast communication, a so-called broadcasting channel, as a channel to perform a data transmission, has been standardized by C. S0001-D v1.0, C. S0002-D v1.0, C. S0003-D v1.0, C. S0004-D v1.0, C. S0005-D v1.0 of the 3GPP2 standard used for the cdma2000 1x, and by C. S0054-0 v1.0 used for the cdma2000 1xEV-DO. A service using this broadcasting channel is referred to as BCMCS (Broadcast Multicast Service).

A channel for the unicast having been used for the communication between the base station and mobile devices in the past has a feature so that a single mobile device alone enables to receive data transmitted from the base station, however, the broadcasting channel standardized for a multicast communication support has a feature so that all of the radio wave receivable mobile devices enable to receive the data transmitted from the base station. In the conventional communication method using the channel used for the unicast, a handoff process etc. is performed in the case where a power control and application for a modulation system, which becomes optimum between the mobile device and base station as a communication target, encounter with other base stations, it is therefore possible to control an optimum communication speed and packet error rate in response to a radio reception environment of the mobile device. However, the control using such the system cannot be performed in the case of using the broadcasting channel, since the mobile devices to be communication targets become unspecified. Particularly, an interference increases around areas between the base stations. Therefore, there arises a problem that a high data rate and low error rate communication cannot be performed. For a purpose of solving the problem, a technique called a soft combine is introduced into the 3GPP2 standard C. S0054 (non-patent document 1).

The soft combine has been known as a technique for improving a reception environment of a communication using the broadcasting channel in a condition where the reception environment in a poor reception area has an interference of radio waves transmitted from a base station located between coverage areas of one base station and the other base station. In the soft combine, each of the base stations transmits identical data at the same time by using the same radio parameter. This makes a receiver of the mobile device to receive and synthesize radio waves arrived from the respective base stations, so that the radio waves from the other base stations which are the source of interference can be changed to a gain to improve the reception environment. In order to realize the soft combine, it is necessary to transmit completely identical data synchronized with the same time information from the base stations. In the case of taking an example of cdma2000 1xEV-DO radio interface, the radio interface in a downstream direction is constituted by an aggregate of time slots of 1.67 ms. However, it is necessary to transmit the data synchronized with the same time information by every time slot of 1.67 ms so that the data to be transmitted between the base stations is not deviated. The soft combine becomes enabled even if there is a transmission timing error between the base stations in the case where the mobile devices have a function for absorbing a radio wave arrival time difference caused by the timing error and propagation delay between the base stations. However, even in this case, it is necessary to perform the synchronization for the data transmission so that a constant amount of the timing difference does not occur between the base stations.

As a technique for assuring the timing synchronized with the identical time information, an anchor system applicable with an A3 interface has been disclosed as disclosed in the 3GPP2 standard A. S0015-C v1.0 (non-patent document 2). This anchor system is used for realizing a technique equivalent to the soft combine called a soft handoff in the cdma2000 1x radio. However, in the anchor system, a single base station becomes an anchor base station to aggregate a plurality of base stations. The anchor base station therefore manages the transmission timing of all of the base stations to control the transmission. The anchor base station indicates a transmitting time for every frame of 20 ms which is a minimum unit of the radio transmission timing as a transmitting time, when data is transmitted to respective base stations. It is therefore noted that the anchor base station serving as an aggregation device to aggregate the base stations should manage radio interface information in detail, for calculating the radio transmission timing.

Non-patent document 1: 3GPP2 standard C. S0054
Non-patent document 2: 3GPP2 standard A. S0015-C v1.0

DISCLOSURE OF INVENTION

Problem to be Solved by the Invention

In the method by anchor system, the aggregation device for the base stations should manage the detailed information for calculating the transmission timing of radio interface, therefore, there arises a problem that the aggregation device must have a complicated logic. The detailed information necessary for the calculation includes, as examples, a transmission delay between the base stations, a radio frame length which is being applied, a transmission rate, a timing period which is ensured for a control channel, etc. Further, for a purpose of aggregating the base stations, a processing performance etc. per unit of the base stations is required. Eventually, an area feasible for the soft combine is restricted by the barrier of limitation caused by the number of connectable base stations, so that the scalability becomes poor.

An object of the invention is to enable a synchronous delivery without having radio inherent information in the aggregation device for aggregating the base stations, and a re-synchronization by transmitting a period number and a transmission byte position in the period as synchronizing information, even in the case that a synchronization is deviated and a lack of packet occurs on the transmission.

Means for Solving the Problem

In the present invention, an anchor base station is not installed as an aggregation device for aggregating the base stations, but the aggregation device is installed as a high order. Timing information is added to transmission data when data is transmitted to the respective base stations from the aggregation device so that the timing can be matched between the base stations necessary for realizing a soft combine.

At this time, the timing information contained in the transmission data includes a sequence number calculated on the basis of a time managed by the aggregation device without using radio inherent parameters. The respective base stations received the transmission data calculate an actual transmitting time from the radio inherent parameters held in the respective base stations on the basis of the sequence number to be able to determine the transmitting time of data. Further, the sequence number enables a re-synchronization, therefore, a constant transmission period is defined. The timing information is constituted by the period number indicating that data for which of a period number should be transmitted and a sequence number indicating that a transmission for which of data among byte numbers in the period should be transmitted, so that the re-synchronization enables even if once the synchronization is deviated and data only directed to a base station from the aggregation device is lost on the transmission.

Further, the invention enables the synchronization of the base stations without completely knowing the transmitting time by the aggregation device.

According to solving means of the invention, a synchronous delivery method provides so that an aggregation device transmits delivery data to radio terminals via a plurality of base stations in synchronization with an identical time information, with use of a radio communication system having the plurality of base stations and the aggregation device for aggregating the plurality of base stations, in which the plurality of base stations transmit, to the aggregation device, a path setting request including a period number corresponding to a transmitting time when the delivery data is divided into constant periods and transmitted, number of transmittable bytes within one period, a transmission start time of the aggregation device corresponding to a predetermined period number added to a transmission packet, and key information for the synchronous delivery, respectively, the aggregation device receives the path setting request to transmit, to the plurality of base stations, respectively, a path setting response including the period number used for a data delivery and a time corresponding to a leading time of a period for the period number, and sets a path for transmitting data from the aggregation device to the respective base stations, the aggregation device adds, to respective packets to deliver the delivery data, the period number and a sequence number indicating a transmission location within the period indicated by the period number, which become a base for calculating time information to be transmitted on a radio, to transmit the packets to the plurality of base stations, and the plurality of base stations calculate the time information to be transmitted on the radio to the radio terminals on the basis of the period number and sequence number added to a received packet, respectively, to synchronize with calculated identical time information and deliver the packet of the delivery data.

Advantage of the Invention

According to the invention, a synchronous delivery is made possible without having radio inherent information in the aggregation device for aggregating the base stations, and a re-synchronization is made also possible by transmitting a period number and a transmission byte position in the period as synchronizing information, even in the case where a synchronization is deviated and the lack of packet occurs on the transmission.

Other objects, features and advantages of the invention will become apparent from the following description of the embodiments of the invention taken in conjunction with the accompanying diagrams.

BEST MODE FOR CARRYING OUT THE INVENTION

In a 1xEV-DO network, an example of embodiments applicable to a synchronous delivery method between base stations in the invention will be described below. The invention is applicable to an appropriate communication system other than the 1xEV-DO.

1. System

Figure 1A:
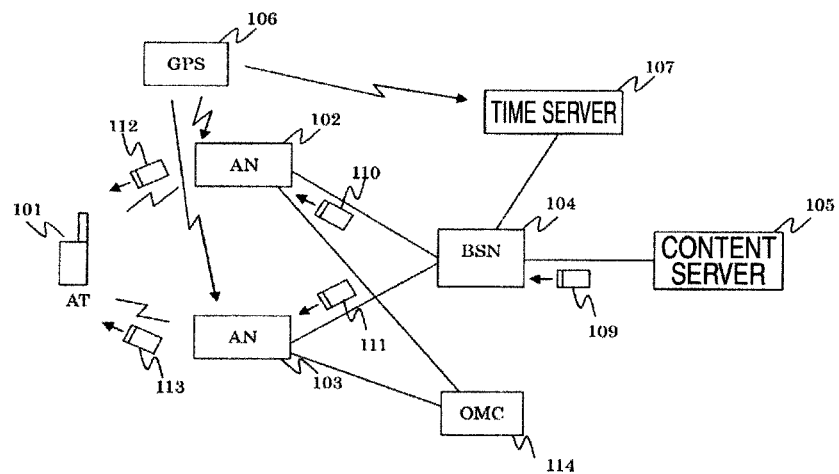
[FIG. 1A] A constitutional diagram showing a process flow of a synchronous delivery between the base stations on the 1xEV-DO network.

FIG. 1A is a constitutional diagram showing a process flow of a synchronous delivery between the base stations on the 1xEV-DO network.

A content server 105 is a server for delivering BCMCS data and performs a management etc. of delivery data and delivery schedule. The content server 105 transmits the delivery data or BCMCS data to a BSN (BCMCS Serving Node) 104 as an aggregation device. The BSN 104 transmits the received data from the content server 105 to an AN (Access Network) 102 and an AN 103 with the data copied. The BSN 104 transmits time information including a transmission period number and a period-in sequence number added to a transmission packet, for example, since it enables to deliver the data to the AN 102 and AN 103 simultaneously. The AN 102 and AN 103 receive the data added with the time information to calculate a time from the time information for transmitting data on the radio and transmit the data when the time comes. An AT 101 as a group of mobile devices receive simultaneously the data transmitted at an identical time from the AN 102 and AN 103 to synthesize signals, so that a good reception quality can be made compared with a case where data is transmitted from a single AN.

The AN 102 and AN 103 are necessary to perform a time synchronization in order to transmit the data in the identical time. In the case of 1xEV-DO system, the network is synchronized with time information delivered from a GPS (Global Positioning System) 106, therefore, it is possible to perform the time synchronization between the AN 102 and AN 103. Further, in order to perform the time synchronization between the BSN 104 and the ANs 102, 103, the BSN 104 uses NTP (Network Time Protocol) etc. from a time sever 107 synchronized with the time information from the GPS 106, therefore, it is possible to perform the time synchronization by receiving the delivery of time synchronization information. The BSN 104 provides a GPS receiver, therefore, it is also possible to perform the time synchronization without passing through the time server 107, and the AN 102 or AN 103 provides a time server function, it is further possible to perform the synchronization.

An OMC (Operation and Maintenance Center) 114 performs to control a start and end of a broadcasting data delivery for the AN 102 and AN 103 etc., and has functions for starting a path setting sequence and path release sequence for processes of a data delivery provision and delivery completion.

In addition, the present invention is applicable to both cases where the time synchronization is made and not made between the AN and BSN. FIG. 1 shows two units of the AN, however, plural units more than two are also applicable. The following embodiment will be described with an applicable example of a network using two units of the AN.

Figure 1B:
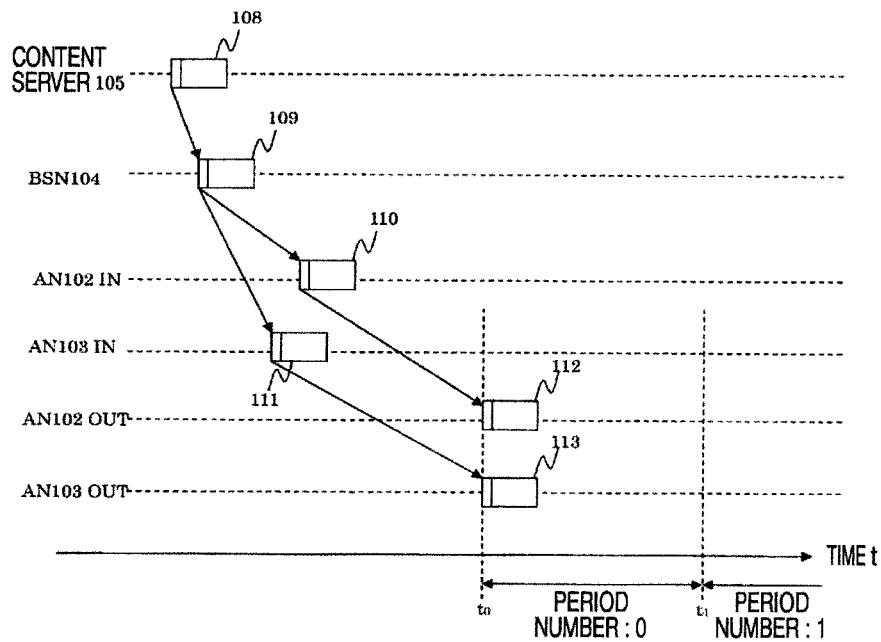
[FIG. 1B] A schematic diagram of a synchronization of packets in the constitution in FIG. 1A.

Further, FIG. 1B shows a synchronization of packets in general.

A packet 108 is transmitted to the BSN 104 from the content server 105, and the BSN 104 receives as a packet 109. The BSN 104 transmits the received packet 109 to the AN 102 and AN 103 as packets 110 and 111, respectively. These packets 110 and 111 contain, for example, period number information as the time information, but it is assumed that a period number 0 was set, in this case. Therefore, the AN 102 and AN 103 hold the packets until a timing when the packets of the period number 0 are transmitted. A packet 112 and packet 113, as shown, are transmitted at an identical timing when a transmission timing comes.

Figure 2:
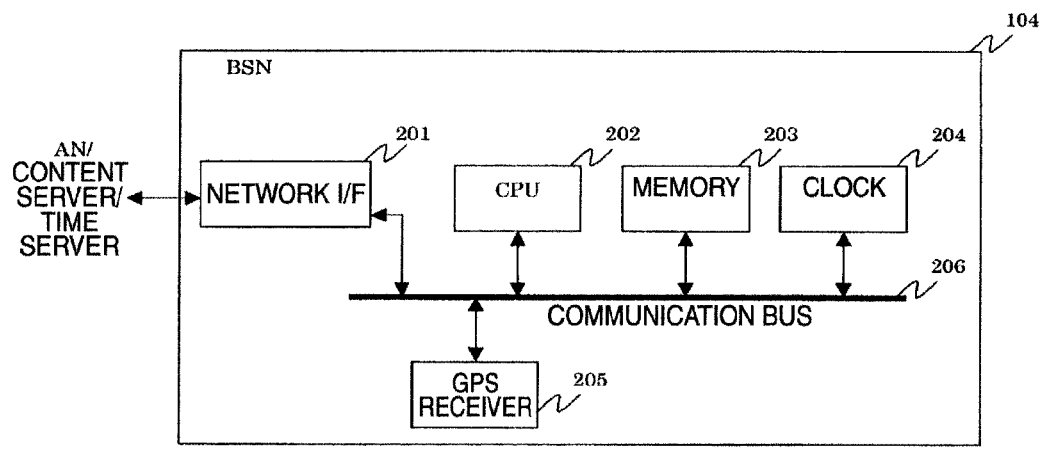
[FIG. 2] A constitutional diagram showing hardware of BSN (BCMCS Serving Node) 104.

FIG. 2 shows hardware of the BSN (BCMCS Serving Node) 104.

The BSN 104 provides with a network I/F 201 for performing a communication with the AN, the content server, etc., and other devices. Data delivered from the content server 105 is written into a memory 203 via the network I/F 201 and a communication bus 206. Received data information which is written is read out by a CPU 202 and added with a sequence number created on the basis of time information provided by a clock 204, and the data information is made into a packet. This packet is again transmitted to the AN via the communication bus 206 and network I/F 201. In the case of performing the time synchronization between the BSN and AN, the time information managed by the clock 204 is synchronized with the time information acquired from a GPS receiver 205 in accordance with a predetermined setting, and also received from the time server 107.

Figure 3:
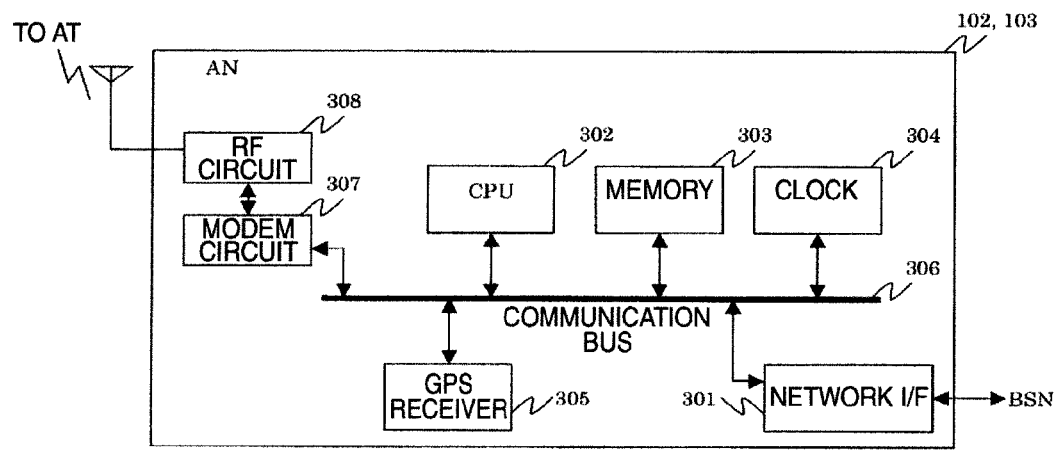
[FIG. 3] A constitutional diagram showing hardware of AN (Access Network) 102 and AN 103.

FIG. 3 shows hardware of the AN (Access Network) 102 and AN 103.

The AN provides a network I/F 301 for performing a communication between the AN and BSN. Data received from the BSN 104 is written into a memory 303 via the network I/F 301 and a communication bus 306. Received data information which is written is read out by a CPU 302 to determine a time for a transmission on the radio by time information provided by a clock 304 and time information added to the received data.

The data is modulated so that it is transmitted to a modem circuit 307 via the communication bus 306 on the radio, when a transmitting time comes. The data is then converted into an analog signal by an RF circuit 308 to transmit on the radio. A GPS receiver 305 receives the time information delivered from the GPS 106, and is incorporated for a purpose of providing the time information to the clock 304.

2. Synchronous Delivery Sequence

Figure 4:
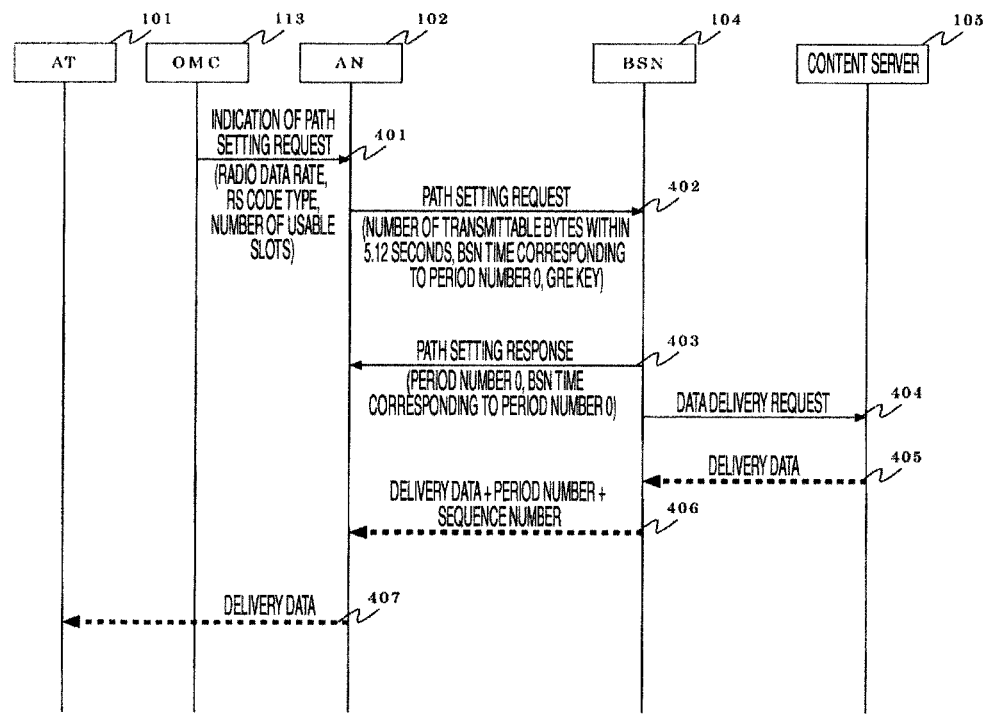
[FIG. 4] A diagram showing a sequence (initial AN connection) until a soft combine.

FIG. 4 is a diagram showing a sequence (initial AN connection) until a soft combine.

This diagram indicates a process flow of setting a path to the BSN 104 by the AN 102 until a performance of data delivery. This sequence indicates a connection to the BSN 104 by the AN 102 in a condition where there is no AN to be connected to the BSN 104.

Prior to performing a data delivery, it is necessary to set a path used for the data communication between the AN and BSN. Therefore, an OMC 113 performs an indication of a path setting request for the AN 102 (401). This indication of the path setting request includes, for example, a radio data rate, RS code type, number of usable slots, etc. The AN 102 receives the indication to transmit the path setting request to the BSN 104 (402). The path setting request is transmitted together with the number of transmittable bytes which is transmitted within a constant period (5.12 seconds as an example in the diagram), a BSN time corresponding to the period number 0, and GRE (General Routing Encapsulation) key information used for the data transmission. The number of transmittable bytes within the constant period is the number of bytes derived from the radio interface standard, which turns to a value specified to the radio system. Therefore, the value cannot be derived without using a device such as the AN which holds radio inherent information. For example, in the case of the 1xEV-DO base station in accordance with the C.S0054 standard, 1 interlace amount (or 192 slots) is used by a setting of 614.4 kbps in transmission rate and 192 slots in Total Burst Length. In the case of using (12, 4, 16) as an RS code, 192 of MAC Packets which is transmittable with data of 1000 bits can be transmitted, however, ¼ of that is used as parity bits for the RS code. Therefore, the number of MAC packets usable for the data transmission during 1.28 seconds is 192×¾=144 packets, that is, 144,000 bits=18,000 bytes are transmittable. In this regard, practically, a data amount which is transmittable during 1.28 seconds is 17,961 bytes because of using a header information transmission of 1 byte for 16 MAC packets. Therefore, a data amount which is transmittable during 5.12 seconds is 17,961×4=71,844 bytes. Here, 1 interlace indicates one division which is one of 4 divisions in a total radio transmitting time, so that 4 interlaces indicate the total radio transmitting time. Further, The Total Burst Length indicates a length of BCMCS transmission setting period represented by every 1 interlace. If 1 interlace is set to 192 slots, the total radio transmitting time is 768 slots as multiplied by 4, that is, 1.28 seconds.

Figures 12, 13:
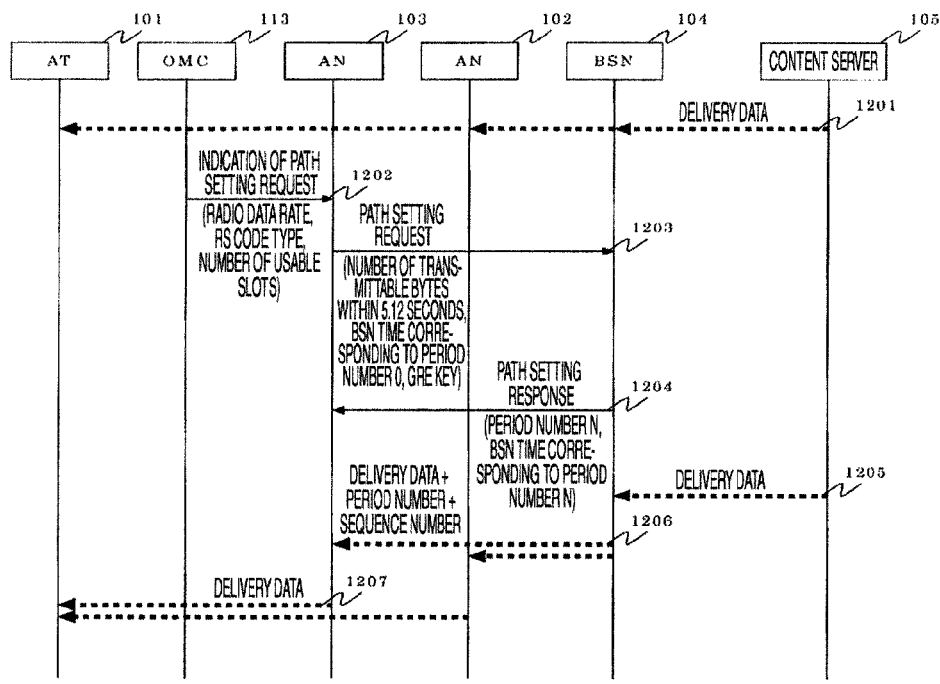
[FIG. 12] A diagram showing a sequence (AN connection from a second unit to subsequent units) until a soft combine.
[FIG. 13] An explanatory diagram for the number of transmittable bytes.

FIG. 13 is an explanatory diagram showing the number of transmittable bytes. This diagram shows a list indicating the number of transmittable bytes per 5.12 seconds in the case where the Total Burst Length is 192 slots, RS code (12, 4, 16), and no framing header, and 1 interlace amount (192 slots) is allotted to the BCMCS data transmission.

A BSN time corresponding to the period number 0 is information used for determining the period number and period-in sequence number added to a transmitting packet when the BSN 104 transmits the data to the AN 102. An application of this information will be explained separately.

A GRE key is set to a key field of a GRE header to be added to the transmitting packet when the data is transmitted to the AN 102 from the BSN 104. The AN 102 confirms the key field of the data received from the BSN 104, so that the data flown into the respective paths can be classified while a plurality of paths between the BSN 104 and AN 102 are being set. In addition, the GRE header will be described later.

The BSN 104 receives the path setting request 402 to perform a path setting process and transmit a path setting response 403 to the AN 102 (403). This path setting response 403 includes a period number used for the data delivery and a corresponding time at a leading time point of the period. At this time point, a path setting is completed for transmitting the data to the AN 102 from the BSN 104, thereby enabling the transmission of data.

The BSN 104 transmits a data delivery request by a signal such as IGMP Join since it indicates to transmit the data to the content server 105, when a data transmission provision between the AN and BSN is completed (404).

The content server 105 receives a data delivery request 405 to start a data delivery (405). The delivery data transmitted from the content server 105 is received by the BSN 104, and added with the period number and period-in sequence number becoming the basis for calculating a time of transmission on the radio, so that the delivery data is transmitted to the AN 102 (406).

For the received delivery data, the AN 102 calculates a time (time information) for the transmission on the radio on the basis of the period number and period-in sequence number added to the received packet, and transmits the data at a time point (synchronized with the time information) matched with the calculated time (407). All of the ANs perform the time synchronization in accordance with the GPS 106, and an algorism for calculating the radio transmitting time from the period number and period-in sequence number received from the BSN 104 is identical, therefore, it is possible to synchronize (matched) the transmitting time on the radio with the identical time information since the respective ANs are synchronized with the GPS time.

FIG. 12 is a diagram showing a sequence (AN connection from a second unit to subsequent units) until the soft combine. This diagram shows a process flow indicating that from when another AN 103 sets a path to the BSN 104 to when the data delivery is performed, in a condition where the AN 102 is already connected to the BSN 104.

The delivery data transmitted from the content server 105 has been transmitted to the AT 101 via the BSN 104 and AN 102 since the AN 102 is already in the condition of setting the path (1201).

The OMC 113 transmits the path setting request indication to the AN 103 to request a path setting (1202). The AN 103 receives the path setting request to transmit it to the BSN 104 (1203). The path setting request is transmitted together with the number of transmittable bytes during a constant period (5.12 seconds as example in the diagram), a BSN time corresponding to the period number 0, and GRE key information used for the data transmission.

The BSN 104 receives the path setting request 1203 to perform a path setting process and transmit a path setting response 1204 to the AN 103 (1204). The path setting response 1204 includes a period number used for the data delivery and a corresponding time at a leading time point of the period. Here, a period number n added to the delivery data on the transmission to the AN 102 by a step 1201 is used as the period number to be transmitted, and a BSN corresponding time corresponding to the time point of period number n is used. The BSN 104 already performs receiving the delivery data used for the AN 102 from the content server (1205). The BSN 104 determines a period number and period-in sequence number to be used on the basis of the period number n and BSN time transmitted by the path setting response 1204 to add them to a data transmitting packet and transmit to the AN 102 and AN 103 (1206).

The AN 102 and AN 103 calculate a transmitting time on the radio on the basis of the period number and period-in sequence number added to the received packet to transmit the data at a time point of the calculated time (1207). The AN 102 and AN 103 are synchronized with the time by the GPS 106, an algorism for calculating a radio transmitting time from the period number and period-in sequence number received from the BSN 104 is identical. It is possible to match with the transmitting time on the radio since the AN 102 and AN 103 are synchronized the time with the GPS time.

Figure 8:
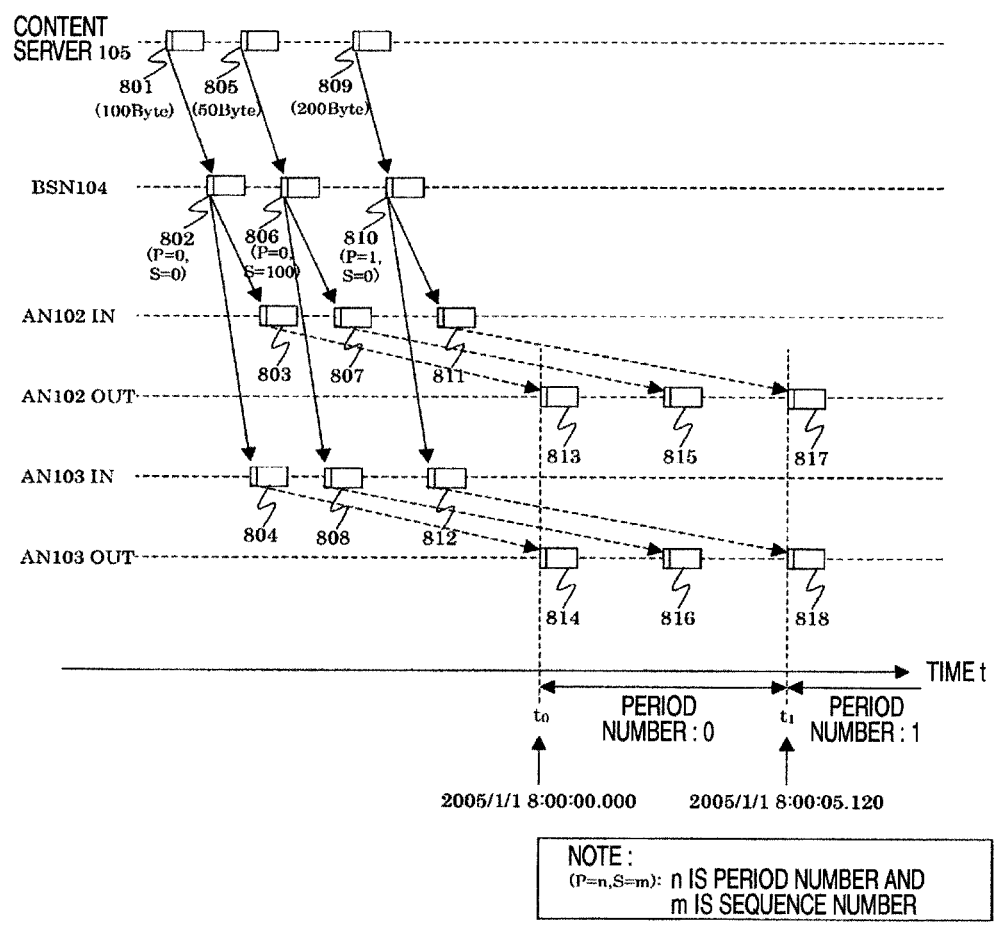
[FIG. 8] A diagram showing a time chart from when BSN 104 transmits packets received from a content server 105 to when AN 102 and AN 103 transmit packets to the radio.

FIG. 8 shows a time chart from when the BSN 104 transmits the packet received from the content server 105 to when the AN 102 and AN 103 transmit the packet on the radio.

Here, as an assumption, a description will be concerned with a case where a path has been set between the AN 102, AN 103 and the BSN 104, and a delivery data is delivered to the BSN 104 from the content server 105 prior to coming a transmitting time $t_0$ corresponding to a synchronizing number 0. Thus, the packet from the synchronizing number 0 and sequence number 0 is delivered from the AN 102 and AN 103 to the AT 101.

A packet 801 having a 100-byte length transmitted from the content server 105 is received by the BSN 104 as a packet 802, and a packet 803 and packet 804 set to a period number (P)0 and sequence number (S)0 are transmitted to the AN 102 and AN 103, respectively. The BSN 104 receives a packet 805 having a 50-byte length transmitted from the content server 105 (packet 806) to compare with the number of transmittable bytes received by the step 402 and a step 1203 within 1 period to determine a period number (P). In the case of this example, packets 807 and 808 set to the period number (P)0 and sequence number (S)100 are transmitted to the AN 102 and AN 103, respectively, by judging that the transmission enables with an identical period. Next, a packet 809 of a 200-byte length transmitted from the content server 105 is received by the BSN 104 as packet 810. The BSN 104 judges that the number of transmittable bytes within 1 period exceeds by causing the transmission of the packets 802 and 806, and transmits packets 811 and 812 set to the following period number (P)1 and reset sequence number (S)0 to the AN 102 and AN 103, respectively.

The AN 102 saves the packets 803 and 807 to a buffer used for the period number 0 and the packet 811 to a buffer used for a period number 1. Likewise, the AN 103 saves the packets 804 and 808 to a buffer used for the period number 0, and the packet 812 to a buffer used for the period number 1. At this time point, each of the AN 102 and AN 103 has an identical content in the buffers.

The AN 102 and AN 103 determine the transmitting time $t_0$ on the basis of the transmitting time corresponding to the period number 0 previously received by the steps 403 and 1204 etc., to start the data transmission from the buffer used for the period number 0 on the radio. Therefore, the AT 101 receives packets 813 and 814 transmitted from the AN 102 and AN 103 at the identical time since the packet 813 transmitted from the AN 102 and the packet 814 from the AN 103 are transmitted as the same data at the identical time, thereby enabling a soft combine. Likewise, the AN 102 and AN 103 transmit packets 815 and 816 as the same data at the identical time, respectively, so that the buffers used for the transmission of the period number 0 of the AN 102 and AN 103 become empty, therefore, the transmission within the period of period number 0 is completed.

Next, when a transmitting time comes to a time $t_1$ of the period number 1, the AN 102 and AN 103 transmit packets 817 and 818 from the buffer used for the period number 1, respectively.

3. The Number of Transmittable Bytes

Figure 5:
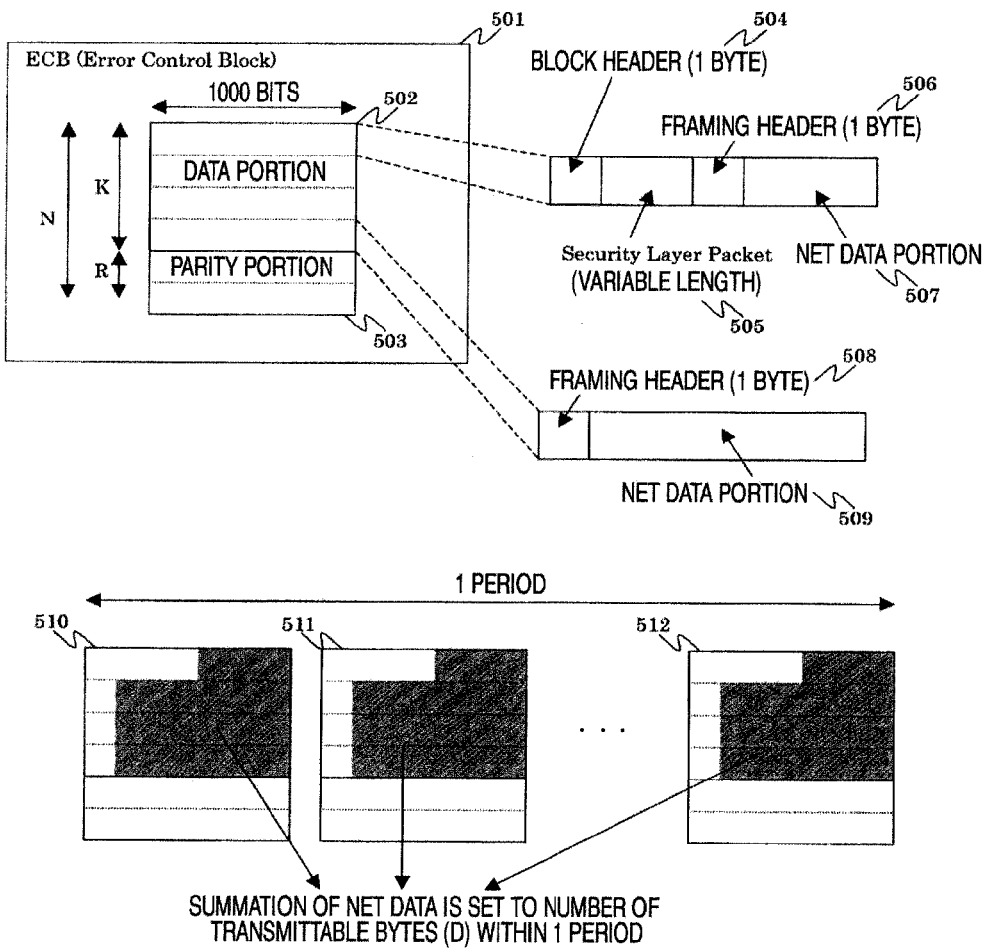
[FIG. 5] An explanatory diagram showing a method of calculating the number of transmissible bytes within one period in which AN notifies to BSN.

FIG. 5 is an explanatory diagram showing a method of calculating the number of transmittable bytes within 1 period during which the AN notifies to the BSN. The delivery system specified by the 3GPP2 standard C. S0054-0 v1.0 prescribes that a transmission is performed by a unit called ECB (Error Control Block) 501.

The ECB 501 is constituted by a plurality of 1000-bit length packets and includes a data portion 502 and parity portion 503. The data portion is a portion for storing data received from the BSN 104, and the parity portion 503 stores an error-correcting code for correcting a packet error which occurs on the transmission of data on the radio.

The lateral width of ECB 501 is set to 1000 bits, however, it is possible to constitute a plurality of packets each having 1000 bits. First 1000 bits of the ECB 501 includes a block header 504 representing a first byte of the ECB 501, a Security Layer Packet 505 for transporting encrypted information, a framing header 506 indicating a start of the data portion, and a net data portion 507 storing net data. Here, the framing header 506 is an option, and not necessary to contain therein if the BSN performs a HDLC like framing by RFC 1662, but necessary if the HDLC like framing is not performed. Further, the 1000-bit length packet in the other data portion 502 includes a framing header 508 and net data portion 509.

The number of transmittable bytes within 1 period is obtained by calculation of how many bytes are contained in the net data portion included in the ECB within 1 period. An example shown in FIG. 5 indicates a case where the ECB included within 1 period is an ECB 510, ECB 511, ..., ECB 512. The number of transmittable bytes within 1 period can be obtained by calculating a summation of the net data portions represented by oblique line portions included in the respective ECB.

4. Packet Structure

Figure 6:
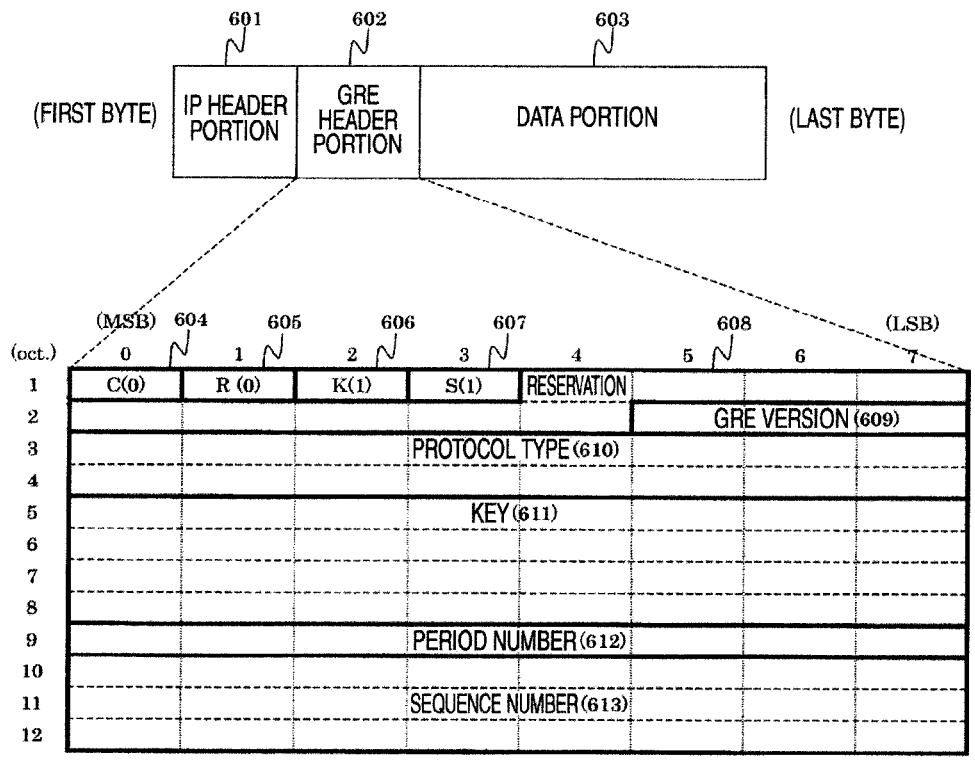
[FIG. 6] A diagram showing a packet structure for transmission from BSN to AN.

FIG. 6 shows a packet structure to be transmitted from the BSN to the AN.

The data transmitted from the BSN is capsuled in accordance with the GRE (General Routing Encapsulation) specified by RFC2784 and RFC2890. In this embodiment, a GRE header using method is modified as shown in the diagram so that time information is added to the data transmitted from the BSN. The packet transmitted from the BSN to the AN includes an IP header portion 601, GRE header portion 602, and data portion 603. Further, the lower part of the diagram shows the GRE header portion 602 in detail. A first or 1 octet has a C bit 604 indicating whether a check sum field is contained in the GRE header, an R bit 605 as a reserved field, a K field 606 indicating whether a key field is contained in the GRE header, an S field 607 indicating whether a sequence number is contained in the GRE header, and a reserved field 608.

In the case of an applicable example in this diagram, the C bit 604 is set to 0 since the check sum field is not used, the reserved bit 605 is set to 0, the K bit 606 is set to 1 since the key field is used, the S bit 607 is set to 1 since the sequence number is used, and the reserved field 608 as remain is set to all 0. A second or 2 octet has a subsequent part of the reserved field 608 and a GRE version field 609. The reserved field 608 is set to all 0, and the GRE version field 609 is also set to 0. A third and fourth or 3 octet and 4 octet include a protocol type field 610 indicating a protocol of the packet contained in the data portion 603, which is set to 8881H indicating Unstructured Byte Stream. A fifth or 5 octet to a eighth or 8 octet include a key field 611 indicating a GRE key. The key field 611 has a value indicated by the path setting request (401, 1203) transmitted from the AN. A ninth or 9 octet to a twelfth or 12 octet are used as a GRE sequence number, however, the sequence number field is used as divided into two fields having a period number 612 and a period-in sequence number 613, respectively, in this embodiment. The period number 612 is a number incremented by one for every change of the transmitting period. The period-in sequence number 613 indicates that a first byte contained in the data portion 603 of a GRE packet corresponds to which of the data in a byte number is present in the period indicated by the period number 612.

Figure 7:
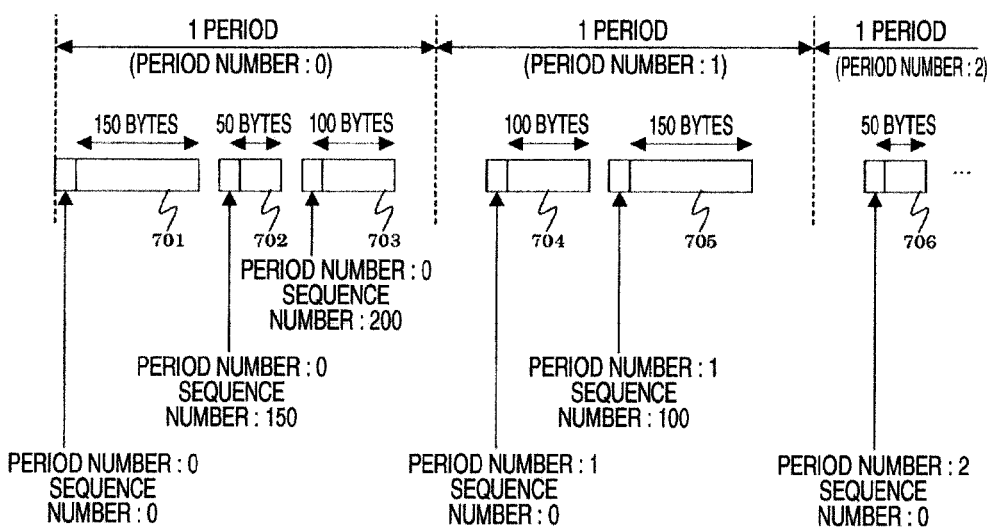
[FIG. 7] A diagram showing a usable example of respective fields in the case of using a period number 612 and a sequence number 614 within a period shown in FIG. 6.

FIG. 7 is a diagram showing a usable example of the respective fields in the case of using the period number 612 and period-in sequence number 613 shown in FIG. 6.

Since a packet 701 is a first packet to be transmitted by a first period, the period number is set to 0 and the sequence number is set to 0. Since a subsequent packet 702 is transmitted within the same period as the packet 701, the period number is similarly set to 0. The sequence number is set to 150 since a first byte of the data portion in the packet 702 is a 151th byte in the period. Likewise, the period number is set to 0 and sequence number is set to 200 in the case of a subsequent packet 703. Since a next packet 704 is a packet to be transmitted within the following period, the period number is set to 1. In the case of the following packets 705 and 706, the period number and sequence number are set in accordance with the same rule.

With the application of the period number, the synchronization can be recovered even though the sequence number between the AN and BSN is out of synchronization. By using a method of allotting the sequence number within the period by every byte, there is an advantage that the synchronization is not deviated from data transmitted from other AN by performing a process which does not transmit the lost amount of packet, even though an intermediate packet is lost on the transmission.

Further, a T (terminate) flag indicating whether the packet is last in the period, may be provided in the GRE header portion. In this case, a transmission source is set by the T flag indicating whether the packet is last in the period. A transmission destination detects the T flag, so that a radio resource ensured for use in the BCMCS within the period can be used for other applications such as a unicast data transmission etc. Therefore, there is an advantage that the spectrum efficiency is enhanced, and the like.

Figure 14:
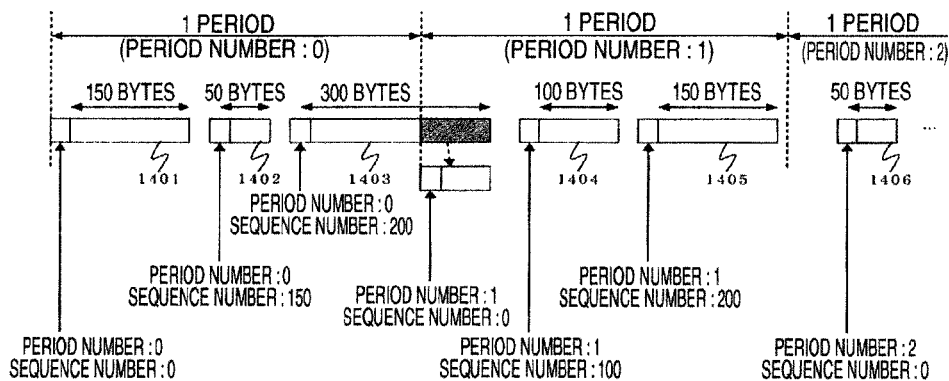
[FIG. 14] A diagram showing a usable example of the period number and sequence number.

FIG. 14 is a diagram showing a usable example of the period number and sequence number. This diagram indicates an example in the case where the packet transmitted from the BSN 104 straddles over periods. It is assumed that the number of transmittable bytes within 1 period is 400 bytes.

A packet 1401 is a first packet to be transmitted by a first period, therefore, the period number is set to 0 and the sequence number is set to 0. A subsequent packet 1402 is transmitted within the same period as the packet 1401, therefore, the period number is set similarly to 0. A first byte of the data portion in the packet 1402 is the 151th byte in the period, therefore, the sequence number is set to 150.

Although the number of transmittable bytes exceeds within 1 period since a subsequent packet 1403 is a 300-byte length, the BSN 104 sets the period number to 0 and the sequence number to 200, and then performs a transmission process as a 200-byte amount from the leading of packet is data belonging to the period number 0, and also performs a transmission process as a remaining 100-byte amount is data belonging to the period number 1. When the BSN 104 transmits a subsequent packet 1404, it judges that the data of 100-byte amount belonging to the period number 1 has already been transmitted at the time point of transmitting the previous packet 1403 to thereby perform the transmission as the period number 1 and sequence number 100. Packets 1405, 1406 and data are transmitted similarly to the foregoing description.

Here, the foregoing method indicates that the packet straddled over the periods is transmitted as unchanged packet. However, a fragmentation process is performed such that a payload is divided after performing the HDLC like framing, and a payload is divided by using an IP fragmentation, thereby folding the packet within the period to enable the data transmission.

5. Determination Method For the Period Number and Sequence Number

Figure 9:
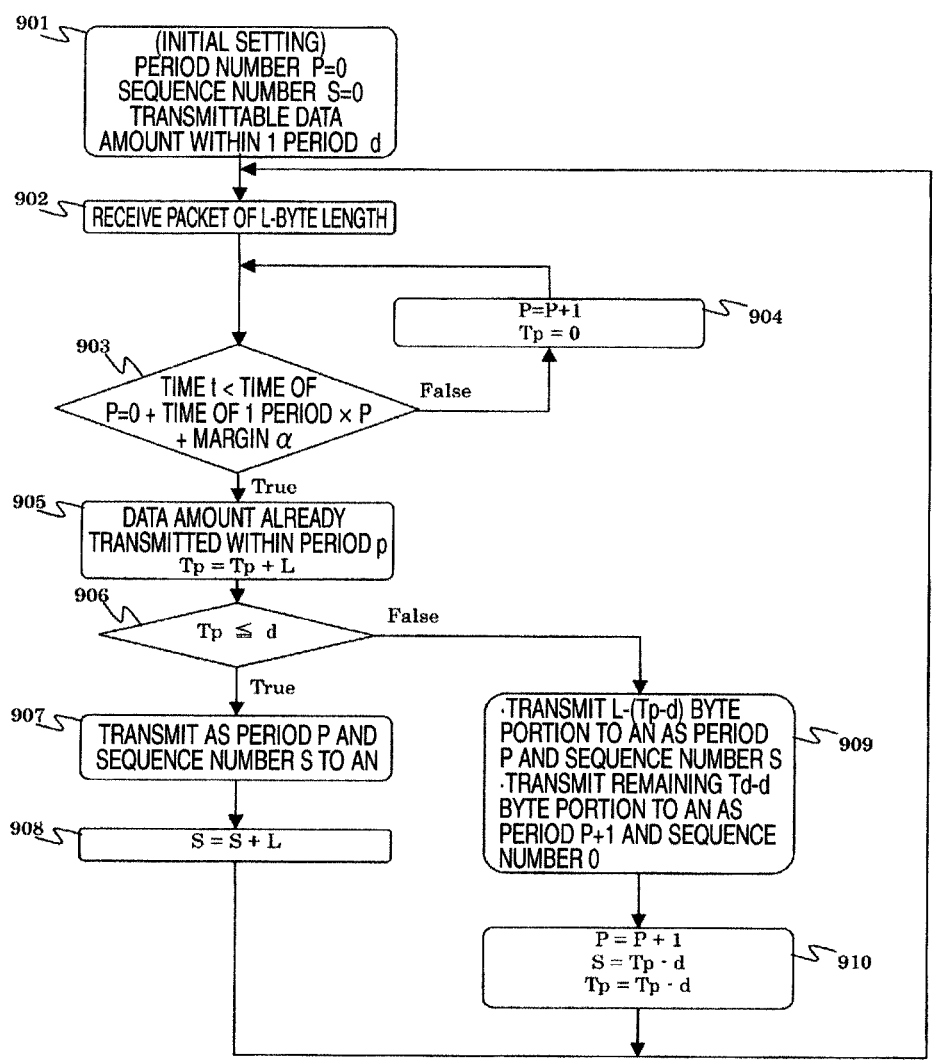
[FIG. 9] A flow chart showing a determination method for the period number and sequence number in BSN 104.

FIG. 9 is a flow chart showing a determination method of the period number and sequence number in the BSN 104.

As an initial setting of parameters in the BSN 104, a period number P on the transmission is set to 0, a sequence number S on the transmission is set to 0, and a transmittable data amount within 1 period is set to d (901). When an L-byte length packet is received (902), a time t managed by the BSN 104 is compared with a radio transmitting time derived from the period number and sequence number. For example, the time t is compared with a sum of a time corresponding to the period number 0 and a margin α which is taken into consideration for a transmission delay, a time deviation, etc. with a value obtained from multiplying a time of 1 period by the period number P. With this comparison operation, it is possible to confirm whether the time t of the BSN 104 is an earlier time than the radio transmitting time derived from the period number and sequence number. From a result of the comparison, if the radio transmitting time is earlier, that is, if the time t is larger than P=time of 0+time period of 1 period×P+α, 1 is added to the period number P, a data amount Tp already transmitted within the period P is set to 0 (904), and the comparison operation is performed again.

As a result of the comparison in a step 903, a received packet length L is added to the data amount Tp already transmitted within the period P (905) if the time t is earlier than the radio transmitting time. If the Tp added therewith does not exceed the transmittable data amount d within 1 period, the data is transmitted to the AN by using the period P and sequence number S (907), and the packet length L is added to the sequence number S (908). If the Tp resulted from the addition exceeds the transmittable data amount d within 1 period, an L−(Tp−d) byte portion is transmitted to the AN from a received first packet by using the period P and sequence number S. A (Tp−d) byte portion as a remaining portion is transmitted to the AN by using the following period number P+1 and sequence number S=0 (909). 1 is then added to the period number P, the sequence number S is set to the number of transmitted bytes (Tp−d) within the period, and the data amount Tp already transmitted within the period P is set to Tp−d (910). The process described above returns to the step 902 and repeats the steps. With use of the foregoing method, an appropriate value as period number and sequence number can be used for performing the soft combine without performing a buffering process in the BSN 104.

Figure 15:
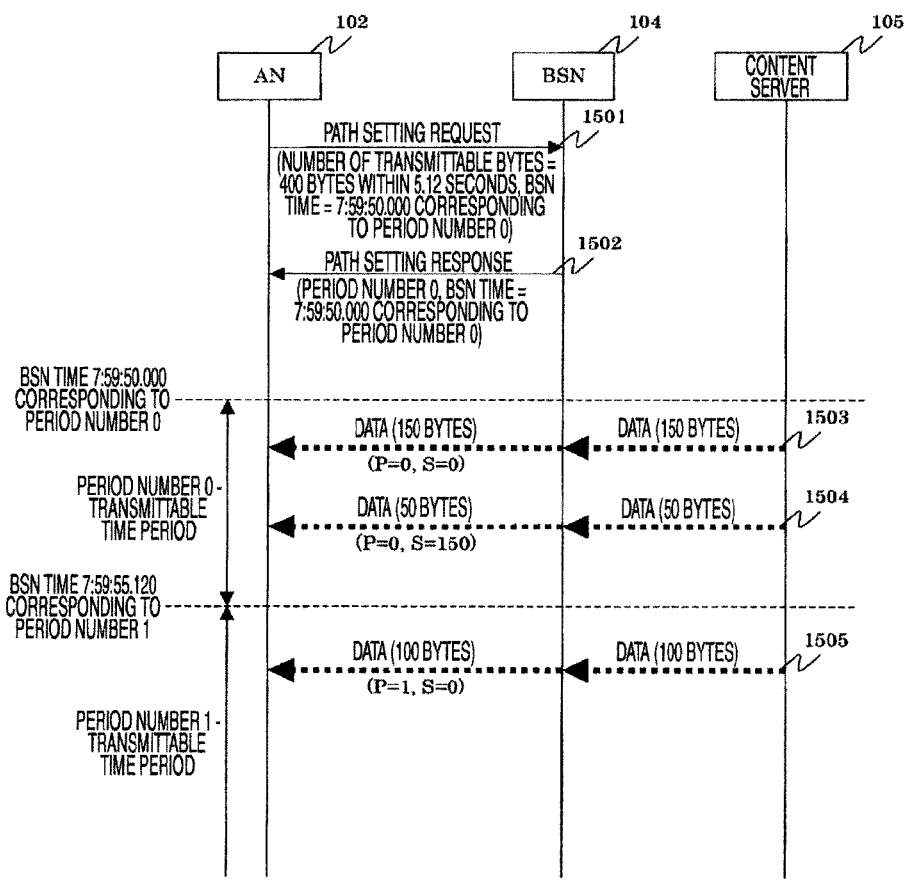
[FIG. 15] A diagram showing an addition example (1) of the period number and sequence number within a period.

FIG. 15 is a diagram showing an addition example (1) of the period number and period-in sequence number. This diagram indicates an example of updating a period number by the BSN time corresponding to the period number.

The AN 102 performs a path setting request to transmit 400 bytes as the number of transmittable bytes and 7:59:50.000 as the BSN time corresponding to the period number 0 within 5.12 seconds (1501). The AN 102 calculates back from the radio transmitting time to thereby calculate a time as the BSN time at which the transmission should be started by the BSN 104, and performs the transmission to the BSN 104. In the case of this example, assuming that the radio transmission starts to transmit data belonging to the period number 0 at 8:00:00.000 from the AN 102, it takes assumingly 10 seconds due to a transmission delay from the BSN 104 to AN 102, a process delay in respective devices, a buffering time, etc. Therefore, 7:59:50.000 subtracted by 10 seconds is selected as BSN time corresponding to the period number 0. The BSN 104 uses the BSN time received from the AN 102 to transmit the period number 0 and a path setting response signal containing the BSN time 7:59:50.000 corresponding to the period number 0 to the AN 102 (1502).

After the BSN time 7:59:50.000 corresponding to the period number 0, data 1503 of 150 bytes transmitted from the content server 105 is a first packet corresponding to the period number 0 to therefore transmit as the period number P=0 and period-in sequence number S=0 to the AN 102. Data 1504 of 50 bytes to be transmitted the next is set with the period number P=0 and the period-in sequence number S=150 in accordance with the previous data length, transmitting to the AN 102.

When the BSN time 7:59:55.120 corresponding to the period number 1 elapses, the transmission by the period number 0 is terminated, and the following transmission uses the period number 1 and subsequent numbers. Data 1505 of 100 bytes to be transmitted the next is set with the period number P=1 and period-in sequence number S=0, transmitting to the AN 102.

Figure 16:
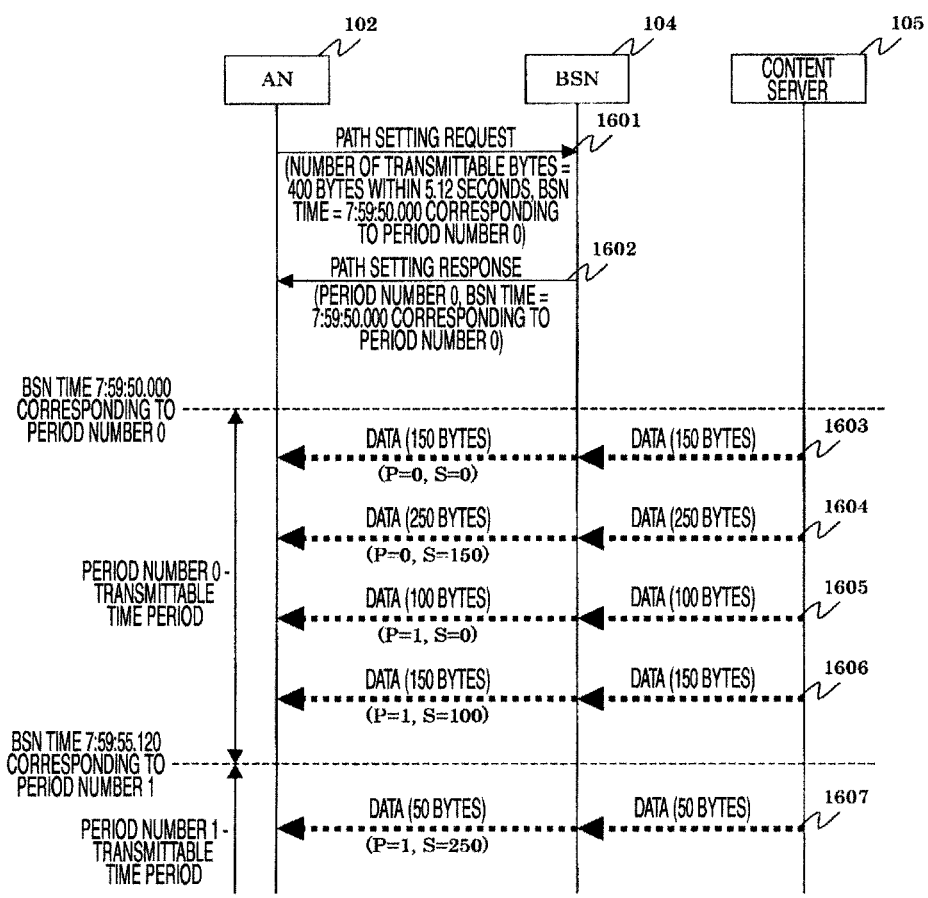
[FIG. 16] A diagram showing an addition example (2) of the period number and sequence number within a period.

FIG. 16 is a diagram showing an addition example (2) of the period number and period-in sequence number. This diagram indicates an example of updating a period number caused by exceeding the number of transmittable bytes within 1 period.

The AN 102 performs a path setting request to transmit 400 bytes as the number of transmittable bytes and 7:59:50.000 as the BSN time corresponding to the period number 0 within 5.12 seconds (1601). The BSN 104 uses the BSN time received from the AN 102 to transmit a path setting response signal containing the period number 0 and the BSN time 7:59:50.000 corresponding to the period number 0 to the AN 102 (1602).

After the BSN time 7:59:50.000 corresponding to the period number 0, data 1603 of 150 bytes transmitted from the content server 105 is a first packet corresponding to the period number 0, therefore, the data is transmitted to the AN 102 as the period number P=0 and period-in sequence number S=0. Data 1604 of 250 bytes to be transmitted the next is set with the period number P=0 and period-in sequence number S=150 in accordance with the previous data length, transmitting to the AN 102. At this time point, the transmission of 400 bytes as the number of transmittable bytes within 1 period is completed, therefore, data of subsequent transmissions uses P=1 as the next period number. In consequence, data 1605 of a 100-byte length to be transmitted the next is transmitted by using the period number P=1 and the period-in sequence number S=0. Further, data 1606 of a 150-byte length to be transmitted the next is transmitted by using the period number P=1 and period-in sequence number S=100. Here, even though the BSN time 7:59:55.120 corresponding to the period number 1 has come, the period number and period-in sequence number are not subject to influence since the period number P=1 is already used. A packet 1607 of a subsequent 50-byte length uses the next number, or the period number P=1 and period-in sequence number S=250.

6. Transmitting Time Determination Method in the AN

Figure 10:
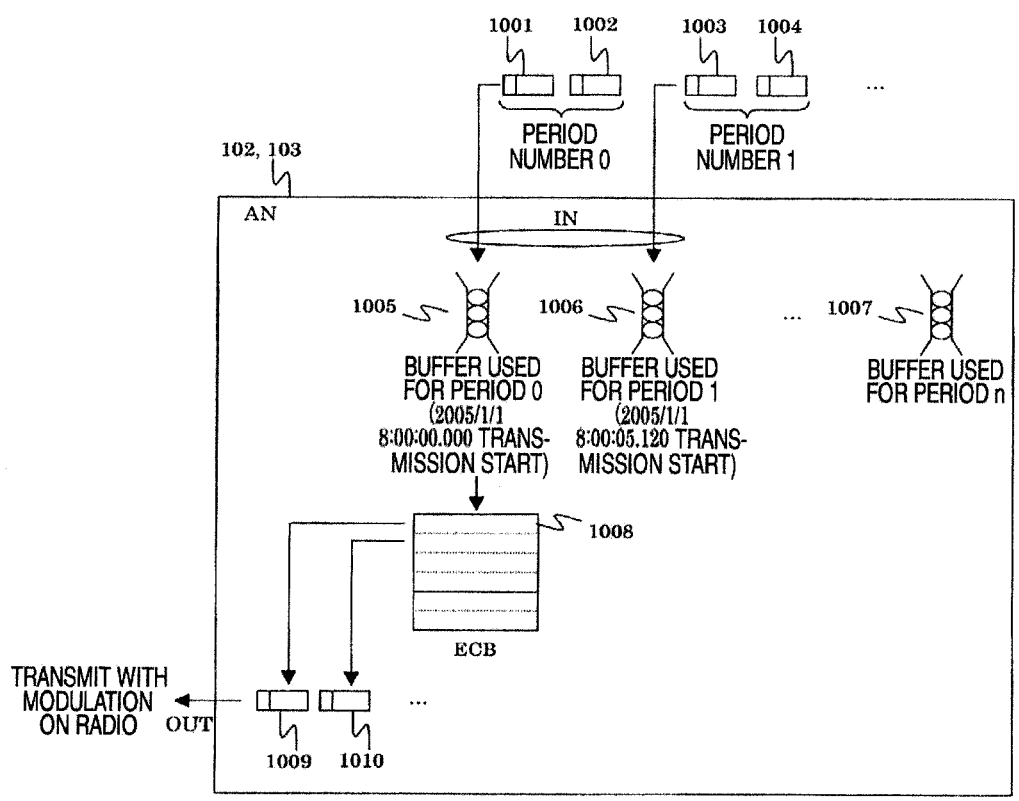
[FIG. 10] A diagram showing a transmitting time determination method in the AN.

FIG. 10 is a diagram showing a transmitting time determination method in the AN. This diagram indicates a sequence from when a packet set by the period number and period-in sequence number is received to when the packet is transmitted on the radio, by the AN.

The AN receives packets 1001 and 1002, which are set to the period number 0, to store these packets in the buffer used for the period 0. Likewise, the AN receives packets 1003 and 1004 set to the period number 1 to store these packets in the buffer used for the period 1.

With the time information held in the AN, when a time comes to the transmitting time corresponding to the buffer used for period 0, a packet transmitting process starts on the radio. This transmitting time is a time indicated by the steps 403 and 1204 in the BSN 104, and the time is commonly used in all of ANs. The AN extracts a packet from a buffer 1005 used for the period 0, which constitutes an ECB 1008. After completing the constitution of ECB 1008, the packets are in turn modulated from a first packet to transmit on the radio (packets 1009 and 1010). When the packet transmission is performed on the radio, identical packets are transmitted at an identical timing from all of the ANs, respectively, since the transmission starts from the first packet within the period of 5.12 seconds. Subsequently, likewise, a time comes to the transmitting time corresponding to the buffer used for the period 1 to perform the packet transmission from a buffer 1006 used for period 1.

7. A Case Where BSN is Not Synchronized With AN in Time

Figure 11:
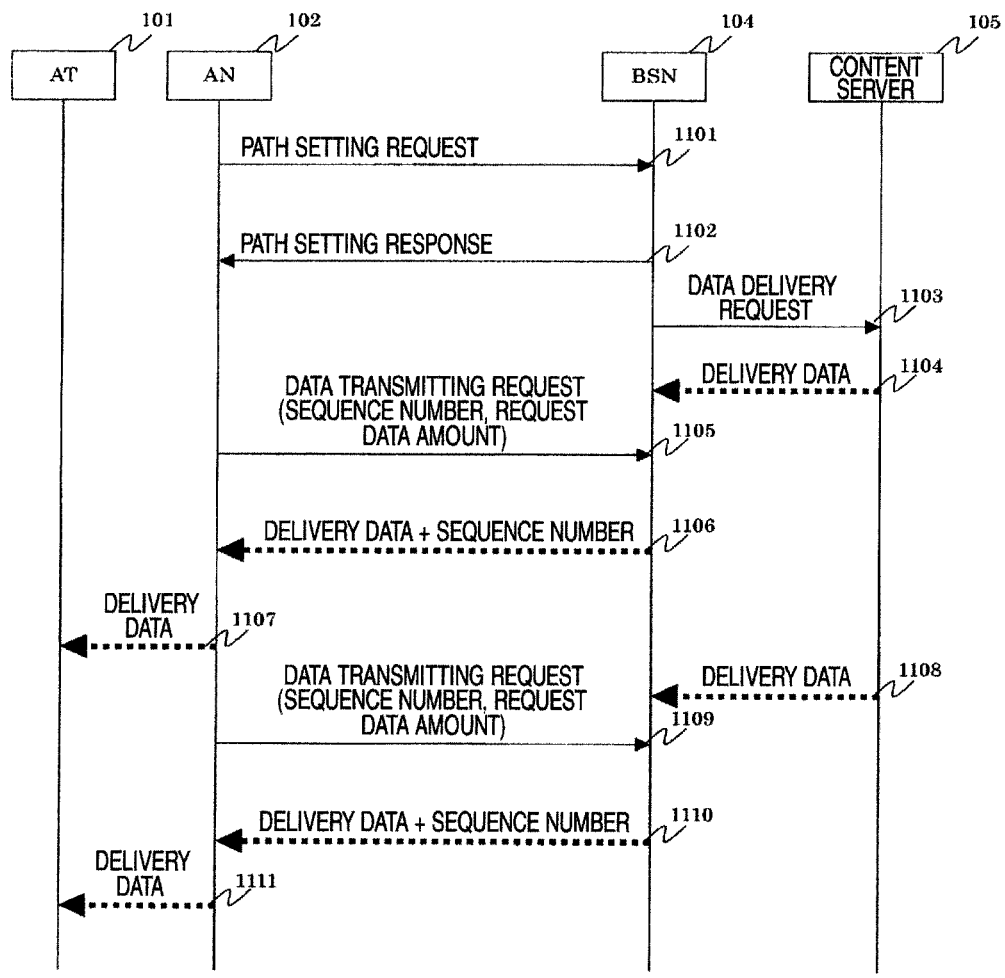
[FIG. 11] A diagram showing a case that times are not synchronized.

FIG. 11 is a diagram showing a case where the BSN is not synchronized with the AN in time. This diagram indicates a sequence of synchronous delivery method between the base stations in the case where the time synchronization is not performed between the BSN and AN by causing a reason that the GPS 106, time server 107, etc. do not use for transmission.

As shown in FIG. 4, even in the case where the time synchronization is not performed between the AN 102 and BSN 104, it is necessary to set a path used for a broadcasting data transmission by the transmission between a path setting request (1101) and a path setting response (1102). After completing the path setting, the BSN 104 transmits a data delivery request to the content server 105 (1103).

The content server starts to transmit delivery data and transmit the delivery data to the BSN 104 (1104). The delivery data is kept buffering in the BSN 104. The AN 102 transmits a data transmitting request with a sequence number and a request data amount to the BSN 104 (1105) when a time comes to a transmission timing of data. In response to this transmission, data added with the indicated sequence number is transmitted to the AN 102 if there is data buffered in the BSN 104. At this time, the transmitted data amount is transmitted so that it does not exceed the request data amount indicated by a step 1005 (1106).

The AN 102 receives the delivery data to calculate a transmitting time from the sequence number and transmit the delivery data at the calculated transmitting time (1107). These foregoing steps are repeated as similar manner (1108, 1109, 1110, 1111). In this way, the AN 102 for understanding the transmission timing controls the sequence number and data amount, and gives an instruction to the BSN 104, so that the synchronous delivery of data can be made, without having the synchronization between the BSN 104 and AN 103 in time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for, in a radio communication system having at least a content server, a plurality of base stations, and a plurality of radio terminals, enabling two or more base stations among the plurality of base stations to broadcast or multicast data delivered from the content server to the radio terminals, the method comprising:

providing a Broadcast Multicast Service (BCMCS) Serving Node between the content server and the two or more base stations;

the two or more stations transmitting a path setting request including time information corresponding to a leading time of a period of period number zero (0) for setting a path of data transmission between the BCMCS Serving Node and the two or more base stations: and the BCMCS Serving Node calculating a transmission time of the data received from the content server on a basis of a time managed by the BCMCS Serving Node, length of data received from the content server, and transmittable data amount within one period, and determining a period number and a sequence number to be included into data to be transmitted to the two or more base stations on a basis of comparison of the calculated transmitting time with time information corresponding to the leading time of the period of the period number zero (0) received from the two or more base stations the BCMCS Serving Node including a period number and a sequence number into data delivered from the content server and transmitting the data including the period number and the sequence number to the two or more base stations;

in case that a synchronization is deviated or data is lost during data delivery from the two or more base stations to the radio terminals, the two or more base stations perform re-synchronization on a basis of the period number and the sequence number included in the data received from the BCMCS Serving Node.

2. The method according to claim 1, wherein:

the two or more base stations and the BCMCS Serving Node are time-synchronized; and the two or more base stations calculate a transmitting time using a same algorism on a basis of the period number, the sequence number, and the time information corresponding to the leading time of the period of the period number zero(0) which are included in the data received from the BCMCS Serving Node, and broadcast or multicast the data received from the BCMCS Serving Node to the radio terminals at the calculated transmitting time.

3. A method for, in a radio communication system having at least a content server, a plurality of base stations, and a plurality of radio terminals, enabling two or more base stations among the plurality of the base stations to broadcast or multicast data delivered from the content server to the radio terminals, wherein a predetermined transmission period is set with respect to the data, the method comprising:

providing a Broadcast Multicast Service (BCMCS)Serving Node between the content server and the two or more base stations;

the BCMCS Serving Node transmitting a period number indicating number of transmission period to which data to be transmitted by the BCMCS Serving Node belongs, a transmitting time corresponding to a leading data of the period number to the two or more base stations and then including the period number and a sequence number within the transmission period into the data to be transmitted to the two or more base stations; and the two or more base stations calculating an identical transmitting time by using a same algorism which is used in the two or more base stations for calculating transmitting time on a basis of the period number, the sequence number, included in the data received from the BCMCS Serving Node and the transmitting time corresponding to a leading data of the period number which is already received by the two or more base stations, and delivering the data received from the BCMCS Serving Node to the radio terminals at the calculated identical transmitting time.

4. The method according to claim 3, wherein:

the period number and the sequence number are calculated on a basis of time information managed by the BCMCS Serving Node.

5. The method according to claim 4, wherein:

the plurality of the base stations holds respective radio parameter specifics thereto; and each of the two or more base stations calculates time information at which data will be transmitted to the radio terminals on a basis of the period number, the sequence number, and the specific radio parameter which the base station holds, and delivers data to the radio terminals at the calculated time.

* * * * *

UNITED STATES PATENT AND TRADEMARK OFFICE
CERTIFICATE OF CORRECTION

| | |
|---|---|
| PATENT NO. | : 8,855,146 B2 |
| APPLICATION NO. | : 13/555222 |
| DATED | : October 7, 2014 |
| INVENTOR(S) | : Yosuke Takahashi et al. |

It is certified that error appears in the above-identified patent and that said Letters Patent is hereby corrected as shown below:

On the Title page, item (73) Assignee:

"Hitachi, Ltd, Tokyo (JP)" should read -- Hitachi, Ltd., Tokyo (JP) --

Signed and Sealed this
Eighth Day of September, 2015

Michelle K. Lee
*Director of the United States Patent and Trademark Office*